United States Patent
Seo et al.

(10) Patent No.: US 9,658,483 B2
(45) Date of Patent: May 23, 2017

(54) LIQUID CRYSTAL LENS AND DISPLAY INCLUDING THE SAME

(71) Applicant: SAMSUNG DISPLAY CO., LTD., Yongin, Gyeonggi-Do (KR)

(72) Inventors: Hyun Seung Seo, Anyang-si (KR); Jin Hwan Kim, Suwon-si (KR); Seung Jun Jeong, Hwaseong-si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 351 days.

(21) Appl. No.: 14/314,919

(22) Filed: Jun. 25, 2014

(65) Prior Publication Data

US 2015/0219960 A1    Aug. 6, 2015

(30) Foreign Application Priority Data

Feb. 4, 2014    (KR) .......................... 10-2014-0012674

(51) Int. Cl.
G02F 1/1335    (2006.01)
G02B 27/22    (2006.01)

(52) U.S. Cl.
CPC ... *G02F 1/133526* (2013.01); *G02B 27/2214* (2013.01); *G02F 1/133528* (2013.01)

(58) Field of Classification Search
CPC .................................................. G02B 27/2214
USPC .................................................... 349/15, 200
See application file for complete search history.

(56) References Cited

U.S. PATENT DOCUMENTS

| 7,345,654 | B2 | 3/2008 | Taira et al. |
| 2002/0159004 | A1* | 10/2002 | Jung ..................... G02B 5/3016 349/87 |
| 2011/0157498 | A1* | 6/2011 | Kim ................. G02F 1/134309 349/15 |
| 2011/0228181 | A1 | 9/2011 | Jeong et al. |
| 2013/0107174 | A1 | 5/2013 | Yun et al. |

FOREIGN PATENT DOCUMENTS

| JP | 2008-281674 | 11/2008 |
| JP | 2010-211036 | 9/2010 |
| JP | 2011-209687 | 10/2011 |
| JP | 2013-041052 | 2/2013 |
| JP | 2013-088775 | 5/2013 |
| KR | 10-0839414 | 6/2008 |
| KR | 10-2011-0077709 | 7/2011 |
| KR | 10-2011-0104701 | 9/2011 |
| KR | 10-2013-0018165 | 2/2013 |
| KR | 10-2013-0046116 | 5/2013 |

* cited by examiner

*Primary Examiner* — Thanh-Nhan P Nguyen
(74) *Attorney, Agent, or Firm* — F. Chau & Associates, LLC (57) ABSTRACT

A liquid crystal lens includes a first substrate, a second substrate which faces the first substrate, a liquid crystal layer which is interposed between the first substrate and the second substrate and a lens polarizer which is disposed on the outside of the second substrate. The lens polarizer includes a first polarization region having a first polarization direction and a second polarization region having a second polarization direction which is different from the first polarization direction.

20 Claims, 9 Drawing Sheets

LIQUID CRYSTAL LENS AND DISPLAY INCLUDING THE SAME

This application claims priority to Korean Patent Application No. 10-2014-0012674 filed on Feb. 4, 2014 in the Korean Intellectual Property Office, the disclosure of which is incorporated by reference herein in its entirety.

TECHNICAL FIELD

The present invention relates to a liquid crystal lens, and more particularly, to a liquid crystal lens and a display device including the same.

DISCUSSION OF THE RELATED ART

Many display devices display an image by emitting light in various ways. The way a display device emits light is often used as a criterion for determining the type of the display device. For example, some display devices use a liquid crystal display (LCD) panel that is lighted by a backlight unit. In such display devices, light from the backlight unit passes through the LCD to display an image.

Some display devices are able to display a three-dimensional (3D) image by providing different images to a viewer's left and right eyes, with the viewer's mind using this information to produce a 3D image. Some 3D displays use 3D glasses (e.g., using a polarization method or a time division method) to provide the distinct images to the viewer's eyes. Other 3D displays do not use 3D glasses (such as a parallax-barrier method, a lenticular method, a microlens method and a blinking light method).

However, sometimes when a viewer watches a 3D video on a 3D display for a long time, the viewer may feel dizzy. In addition, the viewer may want to watch not only 3D video content but also two-dimensional (2D) video content on the same display device.

Liquid crystal lenses may be used to adjust the path of light emanating from the display device so that either a 2D or 3D mode may be provided from the same display device. However, when liquid crystal lenses are so used, crosstalk between left and right-eye images may occur when a 3D image is displayed. In this event, the left eye of the viewer may perceive some of the right eye image and/or the right eye of the viewer may perceive some of the left eye image. This may cause a degraded visual experience in viewing the 3D video content.

SUMMARY OF THE INVENTION

Aspects of the present invention provide a liquid crystal lens that can display a 3D image with little to no crosstalk.

Aspects of the present invention also provide a 3D display having reduced crosstalk.

According to an aspect of the present invention, a liquid crystal lens includes a first substrate, a second substrate which faces the first substrate, a liquid crystal layer which is interposed between the first substrate and the second substrate and a lens polarizer which is disposed on the outside of the second substrate.

The lens polarizer may include a first polarization region having a first polarization direction and a second polarization region having a second polarization direction which is different from the first polarization direction.

According to an aspect of the present invention, a display device includes a display panel and a liquid crystal lens which is disposed on the display panel.

The liquid crystal lens includes a first substrate, a second substrate which faces the first substrate, a liquid crystal layer which is interposed between the first substrate and the second substrate and a lens polarizer which is disposed on the outside of the second substrate. The lens polarizer includes a first polarization region having a first polarization direction and a second polarization region having a second polarization direction which is different from the first polarization direction.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION OF THE DRAWINGS

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

The term "on" may be used herein to designate that an element is directly on another element or to designate that an element is on another element with other elements disposed therebetween. In the entire description of the present invention, the same drawing reference numerals may be used for the same elements across various figures.

Although the terms "first," "second," and so forth are used to describe diverse constituent elements, such constituent elements are not limited by the terms. The terms may be used only to distinguish one element from another elements.

Hereinafter, embodiments of the present invention will be described with reference to the attached drawings.

Figure 1:
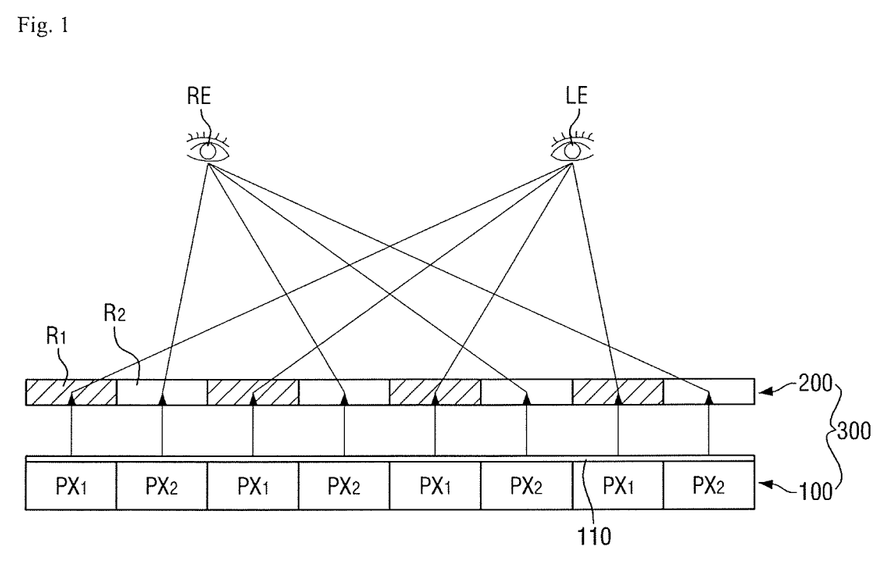
FIG. 1 is a block diagram of a display device according to exemplary embodiments of the present invention.

FIG. 1 is a block diagram illustrating a display device 300 according to exemplary embodiments of the present invention.

Referring to FIG. 1, the display device 300 may include a display panel 100 and a liquid crystal lens 200.

The display panel 100 includes a plurality of pixels PX1 and PX2 and displays an image using light output from each of the pixels PX1 and PX2. The display panel 100 may be a display panel including a luminous device, such as an organic light-emitting display panel, a plasma display panel, a field emission display panel, etc. The display panel 100 may be a display panel including a non-luminous device, such as a liquid crystal display (LCD) panel. In this case, the display device 300 may further include a backlight unit which provides light to the LCD panel.

The pixels PX1 and PX2 of the display panel 100 may be arranged in a matrix. The pixels PX1 and PX2 arranged in a matrix may form a plurality of pixel rows and a plurality of pixel columns. In an exemplary embodiment in which the matrix is rectangular, the number of pixels included in each pixel row may be the same, and the number of pixels included in each pixel column may be the same. In some exemplary embodiments, as in a case where the matrix is circular, the number of pixels included in each pixel row may be different, and the number of pixels included in each pixel column may be different.

The display panel 100 may include a first display substrate and a second display substrate which faces the first display substrate. If the display panel 100 is an LCD panel, a liquid crystal material layer may be interposed between the first display substrate and the second display substrate. A panel polarizer 110 may be attached to an outer surface (a light output side) of the second display substrate.

If the display device 300 is a three-dimensional (3D) image display, the pixels may include a left-eye pixel PX1 and a right-eye pixel PX2. The left-eye pixel PX1 may display a left-eye image, and the right-eye pixel PX2 may display a right-eye image. The left-eye image and the right-eye image may be perceived as a 3D image by a viewer due to binocular disparity. The left-eye image may be an image expected to be observed by a left eye LE of the viewer, and the right-eye image may be an image expected to be observed by a right eye RE of the viewer. The left-eye pixel PX1 and the right-eye pixel PX2 may be alternately arranged along a row direction.

The liquid crystal lens 200 is disposed on the outer surface of the display panel 100. The liquid crystal lens 200 may control the path of light output from the display panel 100. For example, the liquid crystal lens 200 may change the output direction of incident light by refracting or diffracting the incident light.

The liquid crystal lens 200 may include a first region R1 and a second region R2. Each of the first region R1 and the second region R2 of the liquid crystal lens 200 may change the direction of light in each pixel by a different angle according to mode. For example, the first region R1 may be a left-eye region and may be located above the left-eye pixel PX1 that displays a left-eye image. In a 3D mode, the first region R1 may change the direction of light output from the left-eye pixel PX1 such that the light can travel toward the left eye LE of the viewer. The second region R2 may be a right-eye region and may be located above the right-eye pixel PX2 that displays a right-eye image. In the 3D mode, the second region R2 may change the direction of light output from the right-eye pixel PX2 such that the light can travel toward the right eye RE of the viewer. In a 2D mode, the first region R1 and the second region R2 of the liquid crystal lens 200 may each direct light in the same direction or may refrain from changing the direction of light all together.

Figure 2:
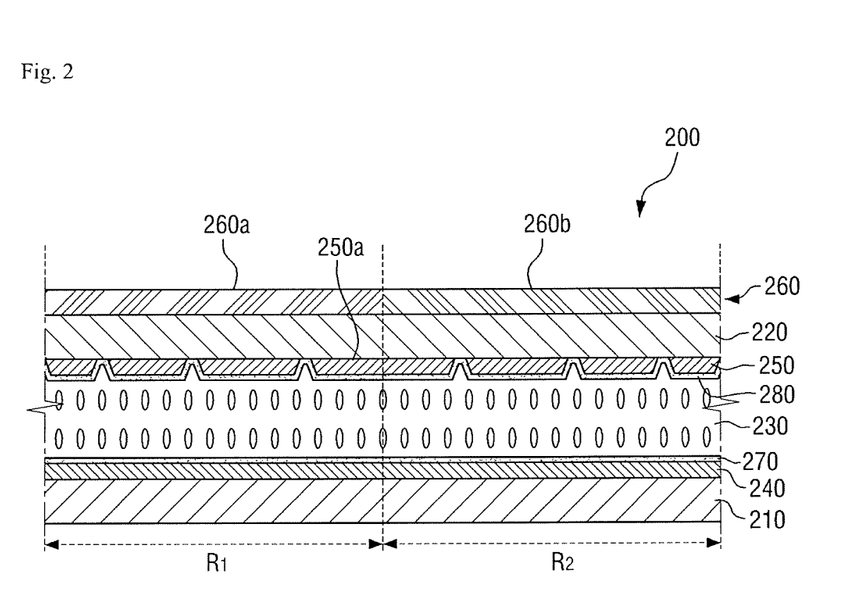
FIG. 2 is a cross-sectional view of a liquid crystal lens of a display device according to an exemplary embodiment of the present invention.
Figure 3:
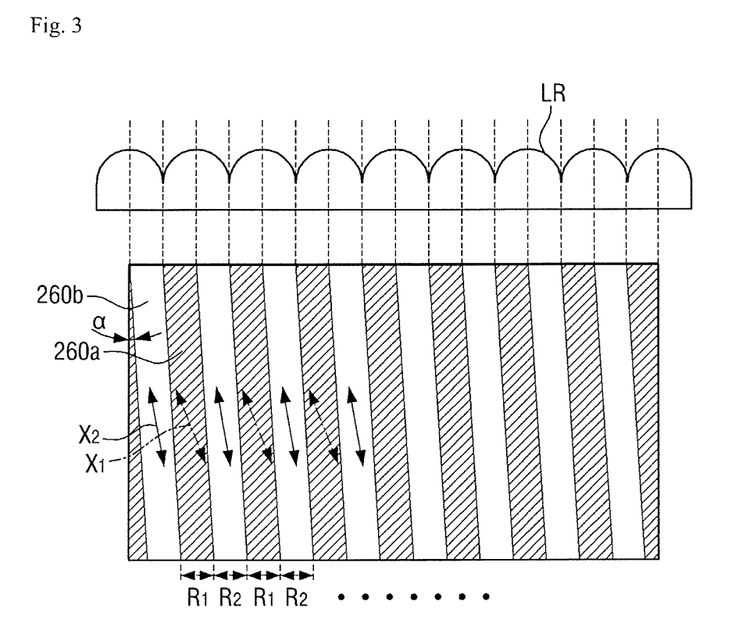
FIG. 3 is a schematic diagram illustrating the planar layout and corresponding cross-sectional shape of the liquid crystal lens of the display according to an exemplary embodiment of the present invention.

Hereinafter, exemplary embodiments of the liquid crystal lens 200 applied to the display device 300 will be described. FIG. 2 is a cross-sectional view of a liquid crystal lens 200 of a display device according to an exemplary embodiment of the present invention. FIG. 3 is a schematic diagram illustrating a planar layout and corresponding cross-sectional shape of the liquid crystal lens 200 of the display device shown in FIG. 2.

Referring to FIGS. 2 and 3, the liquid crystal lens 200 includes a first substrate 210 and a second substrate 220. A liquid crystal layer 230 is interposed between the first substrate 210 and the second substrate 220.

A first electrode 240 may be formed on the first substrate 210, and a second electrode 250 may be formed on the second substrate 220. The first electrode 240 and the second electrode 250 may face each other with the liquid crystal layer 230 interposed therebetween.

The first electrode 240 may be formed as a single body over an entire surface of the first substrate 210. The second electrode 250 may be divided into a plurality of distinct sub electrodes 250a. The sub electrodes 250a may be separated from each other. Each of the sub electrodes 250a of the second electrode 250 may extend along a single direction. The direction in which the sub electrodes 250a extend may be tilted at an angle $\alpha$ with respect to short sides of the liquid crystal lens 200 or a pixel column direction of a display panel 100.

The liquid crystal lens 200 includes a first region R1 and a second region R2. The first region R1 and the second region R2 may extend in the same direction as the direction in which the sub electrodes 250a of the second electrode 250 extend. The first region R1 and the second region R2 may be alternately arranged in a direction intersecting the direction in which the first region R1 and the second region R2 extend. For example, the first region R1 and the second region R2 may be repeatedly and alternately arranged along a long-side direction of the liquid crystal lens 200 or a pixel row direction of the display panel 100. A width of the first region R1 may be equal to a width of the second region R2. The first and second regions R1 and R2 neighboring each other may form a pair and play a similar role to a lenticular lens (LR).

For example, in an off mode (e.g., a two-dimensional (2D) mode), no voltage or the same voltage is applied to the first electrode 240 and the second electrode 250 of the liquid crystal lens 200. Therefore, an electric field is not formed in the liquid crystal layer 230. Accordingly, the liquid crystal lens 200 may pass light output from the display panel 100 without modulating the light.

In an on mode (e.g., a 3D mode), a common voltage is applied to the first electrode 240 of the liquid crystal lens 200, and different voltages are applied to the sub electrodes 250a that are separated from each other. Therefore, an electric field is formed between the first electrode 240 and the second electrode 250. Here, the electric field formed between the first electrode 240 and the second electrode 250 is different in each region where a corresponding sub electrode 250a is disposed. Accordingly, liquid crystal molecules may be rotated and refracted to a different degree in each region where the corresponding sub electrode 250a is disposed. Using this phenomenon, the liquid crystal lens 200 may function as an optical lens such as a GRIN lens that changes the direction of light by refracting the light or a Fresnel zone plate that changes the direction of light by diffracting the light.

The first region R1 and the second region R2 may be tilted at the angle α with resect to the pixel column direction of the display panel 100 or to the short sides of the liquid crystal lens 200.

If the first region R1 and the second region R2 intersect the pixel column direction of the display panel 100 at the angle α, the deterioration of image quality resulting from horizontal color breakup and moire phenomenon can be reduced. The intersection angle α may be set in view of a ratio of the width and length of a pixel, the number of points of view, the arrangement of pixels, etc. For example, assuming that the width of a pixel is a and the length of the pixel is b, the intersection angle α may be defined as $\tan^{-1}(b/a)$. The liquid crystal lens 200 may further include a first alignment layer 270 formed on the first substrate 210 and a second alignment layer 280 formed on the second substrate 220. The first alignment layer 270 may be formed to cover the first electrode 240, and the second alignment layer 280 may be formed to cover the second electrode 250. The liquid crystal layer 230 may be interposed between the first alignment layer 270 and the second alignment layer 280, and the liquid crystal molecules may contact the first alignment layer 270 and the second alignment layer 280.

The first alignment layer 270 has a first alignment direction, and the second alignment layer 280 has a second alignment direction. The liquid crystal molecules may be aligned in the first alignment direction in the vicinity of the first alignment layer 270 and may be aligned in the second alignment direction in the vicinity of the second alignment layer 280. The first alignment direction and the second alignment direction may be different. For example, the first alignment layer 270 and the second alignment layer 280 may be aligned in a substantially anti-parallel direction.

The first alignment direction may be the same as or similar to a polarization direction of light output from the display panel 100. For example, the first alignment direction may be, but is not limited to, the same as or similar to the polarization direction of light output from the display panel 100 (e.g., a polarization direction of a panel polarizer 110 disposed on the outside of the display panel 100). For example, the first alignment direction and the polarization direction may intersect each other at an angle in a range of approximately −5 to 5 degrees.

If the panel polarizer 110 is attached to the outside of the display panel 100, light output from the display panel 100 is polarized in a polarization axis direction of the panel polarizer 110. The liquid crystal molecules arranged on the first alignment layer 270 are polarized in the first alignment direction. Therefore, if the first alignment direction is the same as or similar to the polarization direction of light output from the display panel 100, light loss can be reduced even without a phase-difference film or a polarizer.

The second alignment direction may be, but is not limited to, the same as or similar to the direction in which each of the sub electrodes 250a of the second electrode 250 extends. For example, the second alignment direction and the direction in which each of the sub electrodes 250a of the second electrode 250 extends may intersect each other at an angle in a range of approximately −5 to 5 degrees.

The liquid crystal lens 200 may include a lens polarizer 260 disposed on the outside of the second substrate 220. The polarizer may include either a "polarizing sheet" or a "polarizing film."

The lens polarizer 260 may include a substrate, a polarizing layer formed on the substrate, and an adhesive layer formed under the substrate. The lens polarizer 260 may be attached to an upper surface of the second substrate 220 by the adhesive layer. However, the structure and position of the lens polarizer 260 are not limited to the above example.

The lens polarizer 260 (or the polarizing layer) includes a first polarization region 260a located in the first region R1 and a second polarization region 260b located in the second region R2. A width of the first polarization region 260a may be equal to the width of the first region R1 of the liquid crystal lens 200. A width of the second polarization region 260b may be equal to the width of the second region R2 of the liquid crystal lens 200. In addition, the first polarization region 260a and the first region R1 may completely overlap each other, and the second polarization region 260b and the second region R2 may completely overlap each other. Further, the width of the first polarization region 260a and the width of the second polarizing region 260b may be equal to each other.

The first polarization region 260a may have a first polarization direction X1, and the second polarization region 260b may have a second polarization direction X2 that is different from the first polarization direction X1. In an exemplary embodiment, the entire first polarization region 260a may have the first polarization direction X1, and the entire second polarization region 260b may have the second polarization direction X2.

The first polarization direction X1 and the second polarization direction X2 may be different from the direction in which the first region R1 and the second region R2 extend, respectively. The first polarization direction X1 and the second polarization direction X2 are described in detail below with reference to FIG. 4.

Figure 4:
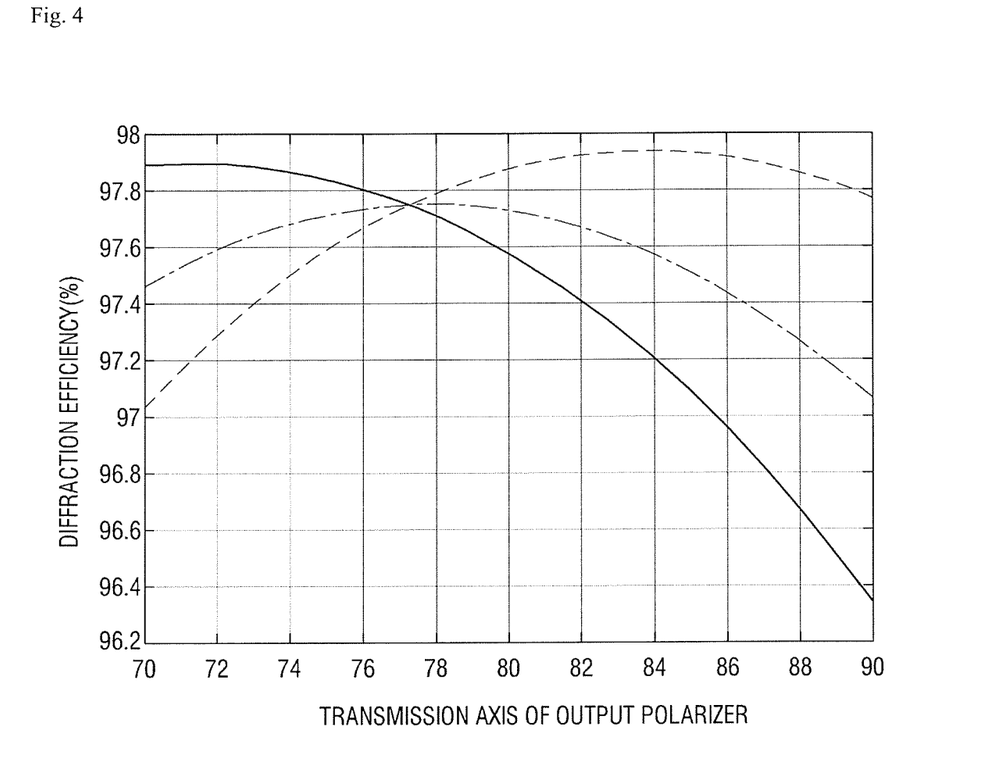
FIG. 4 is a graph illustrating a simulation result of diffraction efficiency according to the polarization direction of the liquid crystal lens.

FIG. 4 is a graph illustrating a simulation of diffraction efficiency according to the polarization direction of the liquid crystal lens 200.

In FIG. 4, the x axis represents an angle (a tilt angle) of a polarization axis (or transmission axis) of the lens polarizer 260 with respect to a horizontal side (the pixel row direction) of the lens polarizer 260, and the y axis represents diffraction efficiency of an image passing through the lens polarizer 260. In addition, a solid line represents diffraction efficiency of a left-eye image passing through the first region R1 of the liquid crystal lens 200, a dotted line represents diffraction efficiency of a right-eye image passing through the second region R2 of the liquid crystal lens 200, and an alternate long and short dash line represents the average of the diffraction efficiency of the left-eye image and the diffraction efficiency of the right-eye image.

Referring to FIG. 4, diffraction efficiency varies not only according to the tilt angle of the lens polarization axis but also according to whether an image is a left-eye image or a right-eye image. This may be because the liquid crystal molecules are rotated to minutely different degrees in the first region R1 and the second region R2. Here, the rotation of the liquid crystal molecules to minutely different degrees in the first region R1 and the second region R2 may result from the fact that the first alignment layer 270 and the second alignment layer 280 are aligned in the substantially anti-parallel direction and that the liquid crystal molecules in the liquid crystal lens 200 are pre-tilted in the vicinity of the first alignment layer 270 and the second alignment layer 280.

In FIG. 4, a left-eye image shows a maximum diffraction efficiency of approximately 97.9% when the tilt angle of the polarization axis is approximately 73 degrees, whereas a right-eye image shows a maximum diffraction efficiency of approximately 97.9% when the tilt angle of the polarization axis is approximately 85 degrees. If the polarization axis of the lens polarizer 260 has a single direction, a maximum diffraction efficiency of approximately 97.7% can be obtained when the tilt angle of the polarization axis is set to approximately 81 degrees, as represented by the alternate long and short dash line. If a tilt angle of the first polarization direction X1 of the first polarization region 260a through which a left-eye image transmits is set to approximately 73 degrees and if a tilt angle of the second polarization direction X2 of the second polarization region 260b through which a right-eye image transmits is set to approximately 85 degrees, a maximum diffraction efficiency of 97.9% on average can be obtained. For example, maximum diffraction efficiency can be increased by setting the polarization directions of the first polarization region 260a and the second polarization region 260b to different directions. This can increase the overall luminance of the display 300, enhance the image quality of a 3D image, and reduce crosstalk between left and right-eye images.

Figure 5:
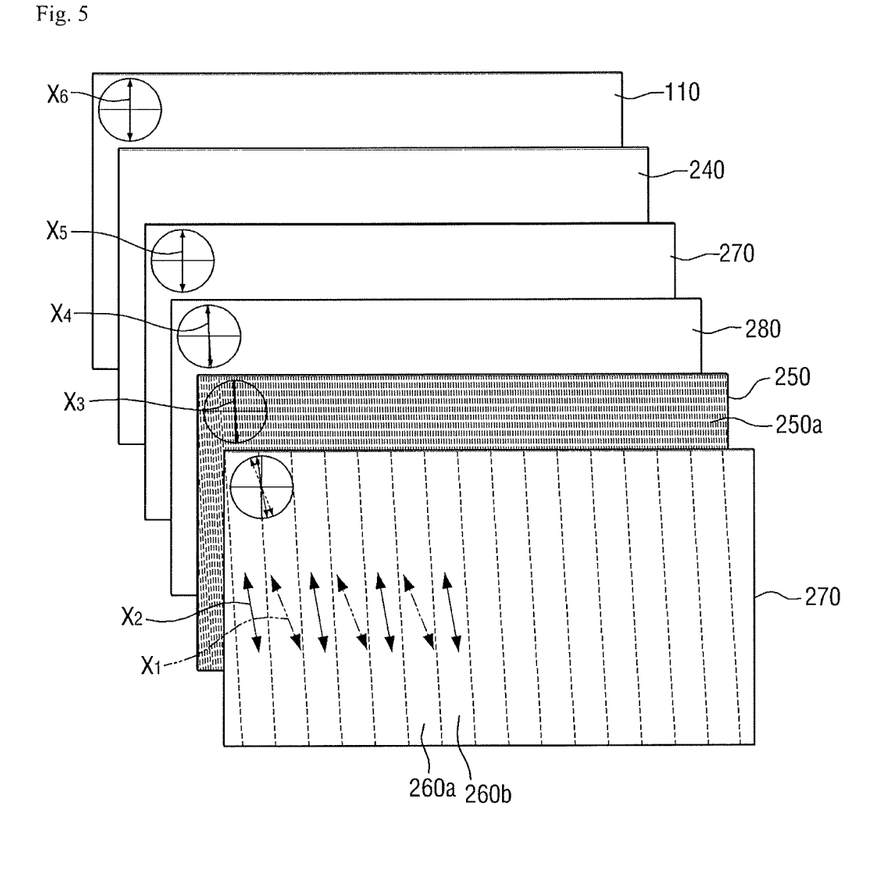
FIG. 5 is a schematic diagram illustrating a transmission path of light in a display device according to an exemplary embodiment of the present invention.

FIG. 5 is a schematic diagram illustrating the transmission path of light in the display according to an exemplary embodiment of the present invention.

Referring to FIG. 5, light output from the display panel 100 is polarized along a polarization direction X6 of the panel polarizer 110. The polarized light entering the liquid crystal lens 200 passes through the first electrode 240 and the first alignment layer 270. Here, if a first alignment direction X5 of the first alignment layer 270 is the same as the polarization direction X6 of the panel polarizer 110, a polarization direction of the incident light matches an alignment direction of liquid crystal molecules adjacent to the first alignment layer 270. Therefore, the light can enter the liquid crystal layer 230 without excessive light loss.

The light entering the liquid crystal layer 230 of the liquid crystal lens 200 is refracted at a predetermined angle along an alignment direction of liquid crystal directors within the liquid crystal layer 230. Then, the light passes through the second alignment layer 280 having a second alignment direction X4 and the second electrode 250 including the sub electrodes 250a which extend in the same direction X3 as the second alignment direction X4. Finally, the light passes through the lens polarizer 260. Here, light passing through the first polarization region 260a of the lens polarizer 260 is polarized in a first polarization direction X1, and light passing through the second polarization region 260b is polarized in a second polarization direction X2. If the first polarization direction X1 and the second polarization direction X2 are set to different directions in which a left-eye image and a right-eye image show maximum diffraction efficiency as described above, the overall luminance and image quality can be increased.

Figure 6:
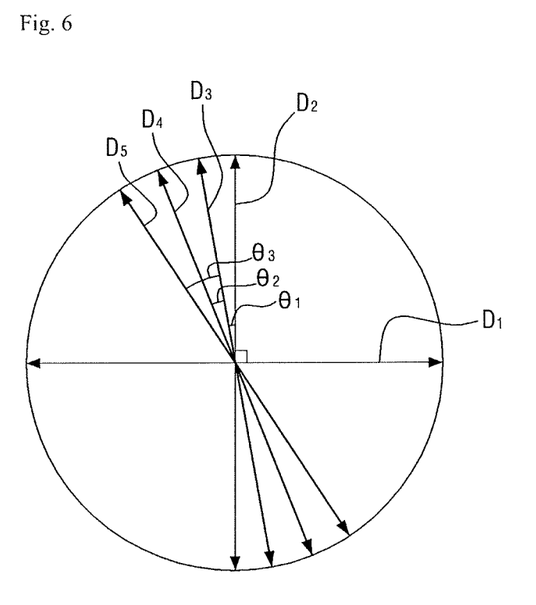
FIG. 6 is a schematic diagram illustrating a plurality of directions in the display according to an exemplary embodiment of the present invention.

FIG. 6 is a schematic diagram illustrating a plurality of directions in the display 300 according to an exemplary embodiment of the present invention. In FIG. 6, a first direction D1, a second direction D2, a third direction D3, a fourth direction D4, and a fifth direction D5 are illustrated as an example.

Referring to FIGS. 5 and 6, the display 300, if rectangular, may have long sides and short sides. If a direction in which the long sides of the display 300 extend is defined as the first direction D1, the short sides of the display 300 extend along the second direction D2 perpendicular to the first direction D1.

Pixel rows in the display panel 100 may be arranged in the first direction D1, and pixel columns may be arranged in the second direction D2.

The polarization direction X6 of the panel polarizer 110 and the first alignment direction X5 of the first alignment layer 270 of the liquid crystal lens 200 may be the same as the second direction D2. The second alignment direction X4 of the second alignment layer 280 of the liquid crystal lens 200 may be the same as the third direction D3 having a first intersection angle θ1 with respect to the second direction D2. The first angle θ1 may be in a range of greater than 0 to 45 degrees. The direction X3 in which the sub electrodes 250a of the second electrode 250 of the liquid crystal lens 200 extend may be the same as the direction in which the first region R1 and the second region R2 of the liquid crystal lens 20 extend or the third direction D3.

The first polarization direction X1 (or the second polarization direction X2) of the lens polarizer 260 may be the same as the fourth direction D4, and the second polarization direction X2 (or the first polarization direction X1) may be the same as the fifth direction D5. The fourth direction D4 may have a second intersection angle θ2 with respect to the third direction D3, and the fifth direction D5 may have a third intersection angle θ3 to the third direction D3. The second angle θ2 and the third angle θ3 may be different from each other and may be set in a range of −15 to 15 degrees or −10 to 10 degrees. Within this range, a left-eye image and a right-eye image can have increased diffraction efficiency, as described above. In FIG. 6, the fourth direction D4 and the fifth direction D5 are located to the left of the third direction D3. Therefore, the second angle θ2 and the third angle θ3 have positive values. However, any one of the two angles can have a negative value, or both of the two angles can have negative values.

Figure 7:
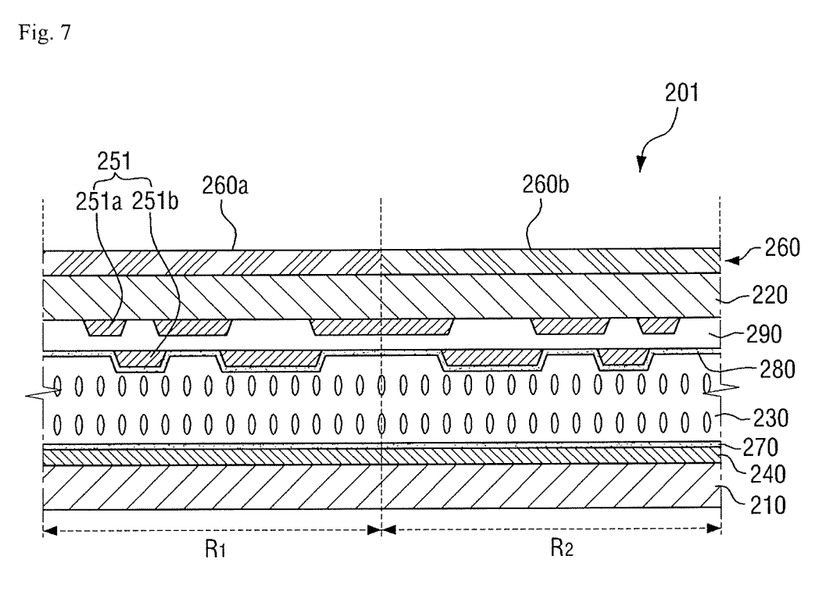
FIG. 7 is a cross-sectional view of a liquid crystal lens according to an exemplary embodiment of the present invention.

FIG. 7 is a cross-sectional view of a liquid crystal lens 201 according to an exemplary embodiment of the present invention. According to an exemplary embodiment, a second electrode 251 of the liquid crystal lens 201 includes a plurality of layers. Referring to FIG. 7, the second electrode 251 of the liquid crystal lens 201 includes a first sub electrode layer and a second sub electrode layer.

The first sub electrode layer includes a plurality of first sub electrodes 251a, and the second sub electrode layer includes a plurality of second sub electrodes 251b. Each of the first sub electrodes 251a and each of the second sub electrodes 251b may extend in the same direction.

An insulating layer 290 may be interposed between the first sub electrode layer and the second sub electrode layer. The first sub electrodes 251a of the first sub electrode layer and the second sub electrodes 251b of the second sub electrode layer may be arranged alternately. The first sub electrodes 251a and the second sub electrodes 251b might not overlap or might mostly not overlap in a vertical direction, and only a lateral end of each of the first sub electrodes 251a and, according to one exemplary embodiment, only a lateral end of each of the second sub electrodes 251b overlap each other.

According to an exemplary embodiment, the first and second sub electrodes 251a and 251b are formed in two layers and are alternately arranged. Therefore, even if the first and second sub electrodes 251a and 251b are arranged in a horizontal direction at shorter intervals, a short circuit between the first and second sub electrodes 251a and 251b which neighbor each other in the horizontal direction can be prevented. Since the first sub electrodes 251a can be arranged at shorter intervals, the profile of an electric field applied to a liquid crystal layer 230 can be controlled precisely.

Figure 8:
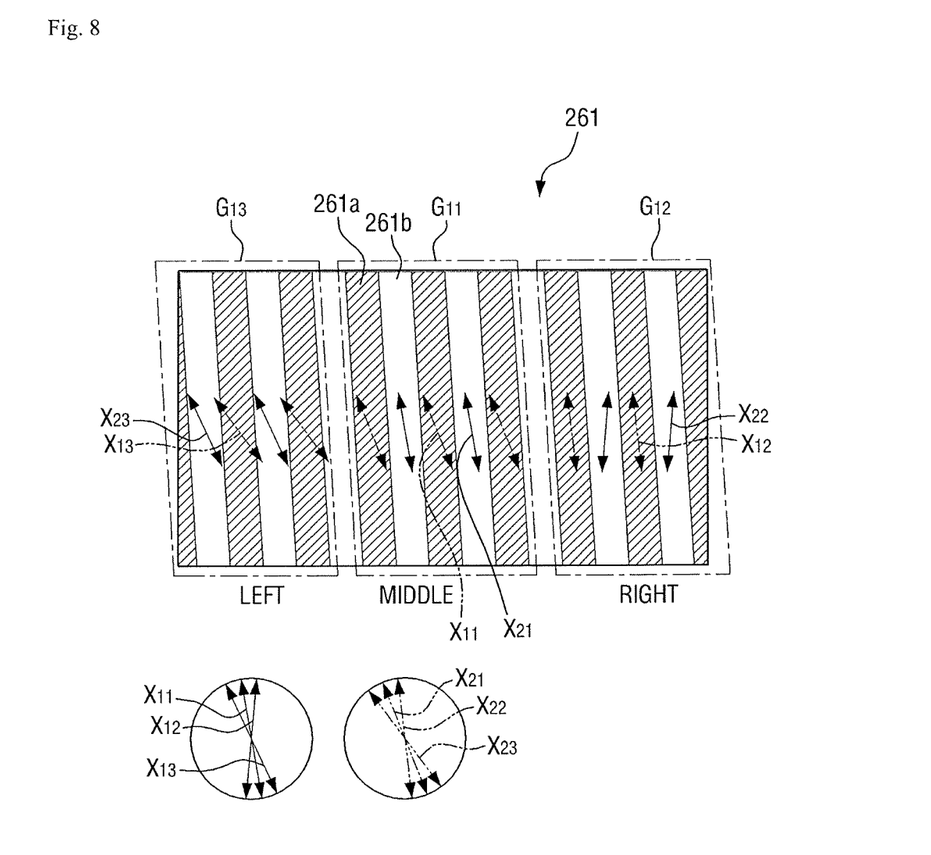
FIG. 8 is a plan view of a lens polarizer of a liquid crystal lens according to an exemplary embodiment of the present invention.

FIG. 8 is a plan view of a lens polarizer 261 of a liquid crystal lens 200 according to an exemplary embodiment of the present invention.

Referring to FIG. 8, the lens polarizer 261 of the liquid crystal lens 200 may include a plurality of polarization groups (G11, G12, G13), each including at least one first polarization region 261a and at least one second polarization region 261b which are adjacent to each other. In an exemplary embodiment, the polarization groups (G11, G12, G13) may include a first polarization group G11, a second polarization group G12, and a third polarization group G13 arranged along a horizontal direction of the lens polarizer 261.

The first polarization group G11 includes a plurality of first polarization regions 261a and a plurality of second polarization regions 261b located in the middle of the lens polarizer 261. The second polarization group G12 includes a plurality of first polarization regions 261a and a plurality of second polarization regions 261b located on a side (a right side in the drawing) of the first polarization group G11. The third polarization group G13 includes a plurality of first polarization regions 261a and a plurality of second polarization regions 261b located on the other side (a left side in the drawing) of the first polarization group G11.

In each of the first through third polarization groups G11 through G13, first polarization directions X11, X12 or X13 of the first polarization regions 261a are the same, and second polarization directions X21, X22 or X23 of the second polarization regions 261b are the same. However, the first polarization direction X11 of the first polarization group G11, the first polarization direction X12 of the second polarization group G12, and the first polarization direction X13 of the third polarization group G13 may be different. Likewise, the second polarization direction X21 of the first polarization group G11, the second polarization direction X22 of the second polarization group G21, and the second polarization direction X23 of the third polarization group G13 may be different. In the drawing, the first and second polarization directions X12 and X22 of the second polarization group G12 and the first and second polarization directions X13 and X23 of the third polarization group G13 are tilted in opposite directions from the first and second polarization directions X11 and X21 of the first polarization group G11. However, they may also be tiled in the same direction.

According to an exemplary embodiment, the first and second polarization directions might not be change according to the polarization group. Instead, the first and second polarization directions may gradually change according to the position in the horizontal direction (a long-side direction). For example, as a distance from the middle of the liquid crystal lens 200 increases, the first polarization directions of the first polarization regions 261a may be gradually tilted with respect to the first polarization directions of the first polarization regions 261a located in the middle of the liquid crystal lens 200. Likewise, as the distance from the middle of the liquid crystal lens 200 increases, the second polarization directions of the second polarization regions 261b may be gradually tilted with respect to the second polarization directions of the second polarization regions 261b located in the middle of the liquid crystal lens 200.

According to an exemplary embodiment, the first and second polarization directions change according to the position in the horizontal direction. Therefore, diffraction efficiency at each point of view in the horizontal direction of a display 300 can be controlled more precisely.

Figure 9:
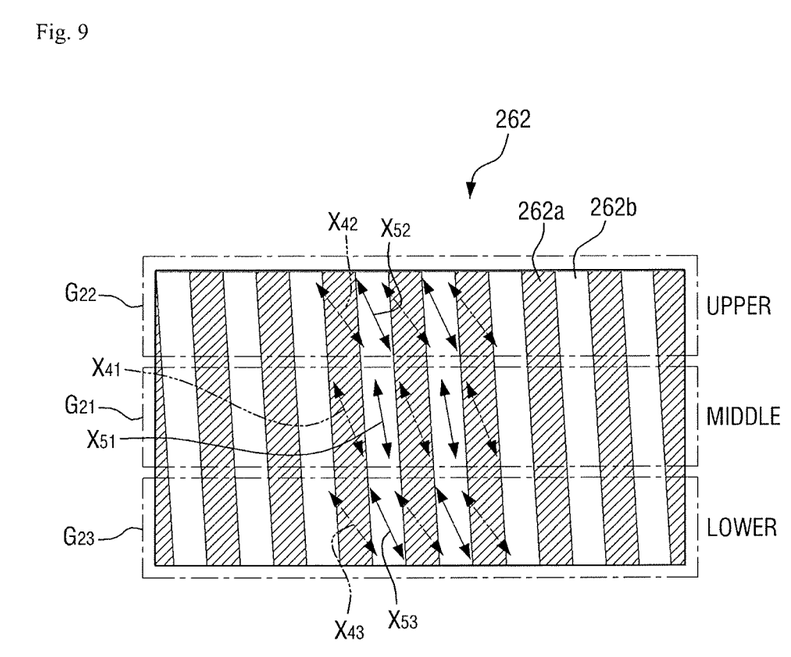
FIG. 9 is a plan view of a lens polarizer of a liquid crystal lens according to an exemplary embodiment of the present invention.

FIG. 9 is a plan view of a lens polarizer 262 of al liquid crystal lens according to an exemplary embodiment of the present invention.

Referring to FIG. 9, the lens polarizer 262 of the liquid crystal lens includes a plurality of polarization groups (G21, G22, G23) arranged along a direction intersecting boundaries between a plurality of first polarization regions 262a and a plurality of second polarization regions 262b. In an exemplary embodiment, the polarization groups (G21, G22, G23) may include a first polarization group G21, a second polarization group G22, and a third polarization group G23 arranged along a vertical direction of the lens polarizer 262.

The first polarization group G21 may traverse the middle of the lens polarizer 262, the second polarization group G22 may be disposed on the first polarization group G21 to traverse the lens polarizer 262, and the third polarization group G23 may be disposed under the first polarization group G21 to traverse the lens polarizer 262. Neighboring polarization groups may be either physically discontinuous or continuous.

First polarization directions X41 of the first polarization regions 262a, which extend in a direction, in the first polarization group G21 may be different from first polarization directions X42 of the first polarization regions 262a in the second polarization group G22 and first polarization directions X43 of the first polarization regions 262a in the third polarization group G23. Likewise, second polarization directions X51 of the second polarization regions 262b, which extend in a direction, in the first polarization group G21 may be different from second polarization directions X52 of the second polarization regions 262b in the second polarization group G22 and second polarization directions X53 of the second polarization regions 262b in the third polarization group G23.

In the drawing, the first and second polarization directions X42 and X52 of the second polarization group G22 and the first and second polarization directions X43 and X53 of the third polarization group G23 are tilted in opposite directions from the first and second polarization directions X41 and X51 of the first polarization group G21. However, they may also be tiled in the same direction.

According to an exemplary embodiment, the first and second polarization directions might not change according to the polarization group. Instead, the first and second polarization directions may gradually change according to the position in the vertical direction (a short-side direction). For example, as a distance to upper and lower sides of the liquid crystal lens decreases, the first polarization directions of the first polarization regions 262a may be gradually tilted with respect to the first polarization directions of the first polarization regions 262a located in the middle of the liquid crystal lens. Likewise, as the distance to the upper and lower sides of the liquid crystal lens decreases, the second polarization directions of the second polarization regions 262b may be gradually tilted with respect to the second polarization directions of the second polarization regions 262b located in the middle of the liquid crystal lens.

According to exemplary embodiments of the present invention, the first and second polarization directions change according to the position in the vertical direction. Therefore, diffraction efficiency at each point of view in the vertical direction of a display 300 can be controlled more precisely.

According to exemplary embodiments of the present invention, maximum diffraction efficiency may be increased by setting polarization directions of first and second polarization regions of a lens polarizer attached to a liquid crystal lens to different directions. This may increase the overall luminance of a display employing the liquid crystal lens, enhance the image quality of a 3D image, and reduce crosstalk between left-eye and right-eye images.

Exemplary embodiments described herein are illustrative, and many variations can be introduced without departing from the spirit of the disclosure or from the scope of the appended claims. For example, elements and/or features of different exemplary embodiments may be combined with each other and/or substituted for each other within the scope of this disclosure and appended claims.

What is claimed is:

1. A liquid crystal lens comprising:
a first substrate;
a second substrate with an inside surface facing the first substrate and an outside surface facing away from the first substrate;
a liquid crystal layer interposed between the first substrate and the second substrate; and
a lens polarizer disposed on the outside surface of the second substrate,
wherein the lens polarizer comprises a first polarization region having a first polarization direction when in a first mode and a second polarization region having a second polarization direction which is different from the first polarization direction when in the first mode, and
when in a second mode, the first polarization region and the second polarization region have a same polarization direction as each other.

2. The liquid crystal lens of claim 1, wherein the first polarization region and the second polarization region extend in a first direction and are alternately arranged along a second direction intersecting the first direction.

3. The liquid crystal lens of claim 1, further comprising:
a first electrode formed on the first substrate; and a second electrode which is formed on the inside surface of the second substrate and is divided into a plurality of sub electrodes.

4. The liquid crystal lens of claim 3, wherein each of the plurality of sub electrodes extends in the first direction.

5. The liquid crystal lens of claim 3, further comprising:
a first alignment layer formed on the first electrode; and
a second alignment layer formed on the second electrode and aligned in the first direction.

6. The liquid crystal lens of claim 5, wherein an alignment direction of the first alignment layer is different from the first direction.

7. The liquid crystal lens of claim 1, wherein a width of the first polarization region is equal to a width of the second polarization region.

8. The liquid crystal lens of claim 7, wherein the lens polarizer comprises a plurality of polarization groups, each of which comprises at least one first polarization region and at least one second polarization region which are adjacent to each other, wherein the plurality of polarization groups include polarization groups having different first polarization directions and different second polarization directions.

9. The liquid crystal lens of claim 7, wherein the lens polarizer comprises a plurality of polarization groups each of which are arranged in a direction intersecting a boundary between the first polarization region and the second polarization region, wherein the first polarization region has different first polarization directions in different polarization groups, and the second polarization region has different second polarization directions in different polarization groups.

10. A liquid crystal lens comprising:
a first substrate;
a second substrate with an inside surface facing the first substrate and an outside surface facing away from the first substrate;
a liquid crystal layer interposed between the first substrate and the second substrate; and
a lens polarizer disposed on the outside surface of the second substrate, wherein the lens polarizer comprises a first polarization region having a first polarization direction and a second polarization region having a second polarization direction which is different from the first polarization direction,
wherein the first polarization re ion and the second polarization region extend in a first direction and are alternately arranged along a second direction intersecting the first direction, and
wherein each of the first polarization direction and the second polarization direction is tilted with respect to the first direction.

11. The liquid crystal lens of claim 10, wherein a tilt angle of each of the first polarization direction and the second polarization direction with respect to the first direction is within a range of −10 to 10 degrees.

12. A display device comprising:
a display panel; and
a liquid crystal lens disposed on the display panel, wherein the liquid crystal lens comprises:
a first substrate;
a second substrate;
a liquid crystal layer interposed between the first substrate and the second substrate; and
a lens polarizer which is disposed on a side of the second substrate opposite to the liquid crystal layer,
wherein the lens polarizer comprises a first polarization region having a first polarization direction when in a first mode and a second polarization region having a second polarization direction which is different from the first polarization direction when in the first mode, and
when in a second mode, the first polarization region and the second polarization region have a same polarization direction as each other.

13. The display device of claim 12, wherein the first polarization region and the second polarization region extend in a first direction and are alternately arranged along a second direction intersecting the first direction.

14. The display device of claim 12, wherein the liquid crystal lens comprises: a first electrode formed on the first substrate; and a second electrode formed on the second substrate and facing first electrode and is divided into a plurality of sub electrodes.

15. The display device of claim 14, wherein each of the plurality of sub electrodes extends in the first direction.

16. The display device of claim 14, further comprising a panel polarizer which is disposed between the display panel and the liquid crystal lens, wherein the liquid crystal lens comprises a first alignment layer which is aligned in the same direction as a polarization direction of the panel polarizer and a second alignment layer which is formed on the second electrode and aligned in the first direction.

17. The display device of claim 16, wherein the alignment direction of the first alignment layer is different from the first direction.

18. The display device of claim 12, wherein the display panel comprises a left-eye pixel and a right-eye pixel, wherein the first polarization region is disposed on the left-eye pixel and overlaps the left-eye pixel, and the second polarization region is disposed on the right-eye pixel and overlaps the right-eye pixel.

19. A display device comprising:
a display panel; and
a liquid crystal lens disposed on the display panel, wherein the liquid crystal lens comprises:

a first substrate;
a second substrate;
a liquid crystal layer interposed between the first substrate and the second substrate; and
a lens polarizer which is disposed on a side of the second substrate opposite to the liquid crystal layer,
wherein the lens polarizer comprises a first polarization region having a first polarization direction and a second polarization region having a second polarization direction which is different from the first polarization direction,
wherein the first polarization re ion and the second polarization region extend in a first direction and are alternately arranged along a second direction intersecting the first direction, and
wherein each of the first polarization direction and the second polarization direction is tilted with respect to the first direction.

20. The display device of claim 19, wherein a tilt angle of each of the first polarization direction and the second polarization direction with respect to the first direction is within a range of −10 to 10 degrees.

\* \* \* \* \*